United States Patent [19]

Lajoie et al.

[11] 4,159,072

[45] Jun. 26, 1979

[54] PIPE ALIGNING APPARATUS

[76] Inventors: Marcel Lajoie, R.R. #1; Bernard Lajoie, R.R. #2, both of Sombra, Ontario, Canada, NOP 1HO

[21] Appl. No.: 861,601

[22] Filed: Dec. 19, 1977

[51] Int. Cl.² .......................................... B23K 37/04
[52] U.S. Cl. ...................................... 228/49; 269/49
[58] Field of Search ................ 228/44.5, 49 B; 269/49

[56] References Cited

U.S. PATENT DOCUMENTS

| 2,413,103 | 12/1946 | Forbes, Jr. ......................... 228/49 B |
| 2,780,194 | 2/1957 | Croswell ......................... 228/44.5 X |
| 3,369,725 | 2/1968 | Thomas et al. ...................... 228/49 B |
| 3,561,320 | 2/1971 | Nelson et al. .................... 228/44.5 X |
| 4,053,973 | 10/1977 | Meli ................................. 228/44.5 X |

Primary Examiner—C. W. Lanham
Assistant Examiner—Kenneth J. Ramsey
Attorney, Agent, or Firm—Hirons, Rogers & Scott

[57] ABSTRACT

Apparatus is provided for use in aligning a new pipe section with an existing pipe section to facilitate welding the new pipe section to the existing pipe section. The apparatus is adapted to fit within the pipe sections and to be moved longitudinally along the pipe sections and includes an actuator means disposed longitudinally and including a longitudinal rod; a plurality of spaced-apart radial elements; means fixedly coupled to the actuator means and defining radial guides for the radial elements to guide the elements between a withdrawn position and an engagement position in which the elements are positioned to engage both the existing and the new pipe sections to thereby align the new pipe section with the existing pipe section; and a plurality of links attached one to each of the radial elements and to the longitudinal rod. The links are inclined outwardly and away from the actuator means whereby a longitudinal force from the actuator means in a direction towards the links creates a compressive force in the links to cause the links to move the elements in the respective radial guides from the withdrawn to the engagement positions.

7 Claims, 4 Drawing Figures

PIPE ALIGNING APPARATUS

This invention relates to apparatus for aligning a new section of pipe with an existing pipe section to facilitate welding the new section to an end of the existing pipe section.

Large sections of pipe are usually welded to one another to create continuous lengths of pipe known sometimes as pipeline. In order that the weld between sections of pipe should be continuous and strong it is essential to ensure that ends of the pipe are brought against one another and aligned with one another so that both sections are concentric about the same axis. Various pieces of apparatus have been used for this purpose and although some are quite useful they are expensive and they require considerable maintenance.

It is an object of the present invention to provide a relatively simple apparatus which both aligns and clamps a new section of pipe in a position relative to an existing section of pipe to facilitate welding and which can be disengaged readily and moved along the new pipe section into psition for welding the next new section of pipe.

Accordingly, apparatus is provided for use in aligning a new pipe section with an existing pipe section to facilitate welding the new pipe section to the existing pipe section. The apparatus is adapted to fit within the pipe sections and to be moved longitudinally along the pipe sections and includes an actuator means disposed longitudinally and including a longitudinal rod; a plurality of spaced-apart radial elements; means fixedly coupled to the actuator means and defining radial guides for the radial elements to guide the elements between a withdrawn position and an engagement position in which the elements are positioned to engage both the existing and the new pipe sections to thereby align the new pipe section with the existing pipe section; and a plurality of links attached one to each of the radial elements and to the longitudinal rod. The links are inclined outwardly and away from the actuator means whereby a longitudinal force from the actuator means in a direction towards the links creates a compressive force in the links to cause the links to move the elements in the respective radial guides from the withdrawn to the engagement positions.

The invention will be better understood with reference to the drawings, in which.

Figure 1:
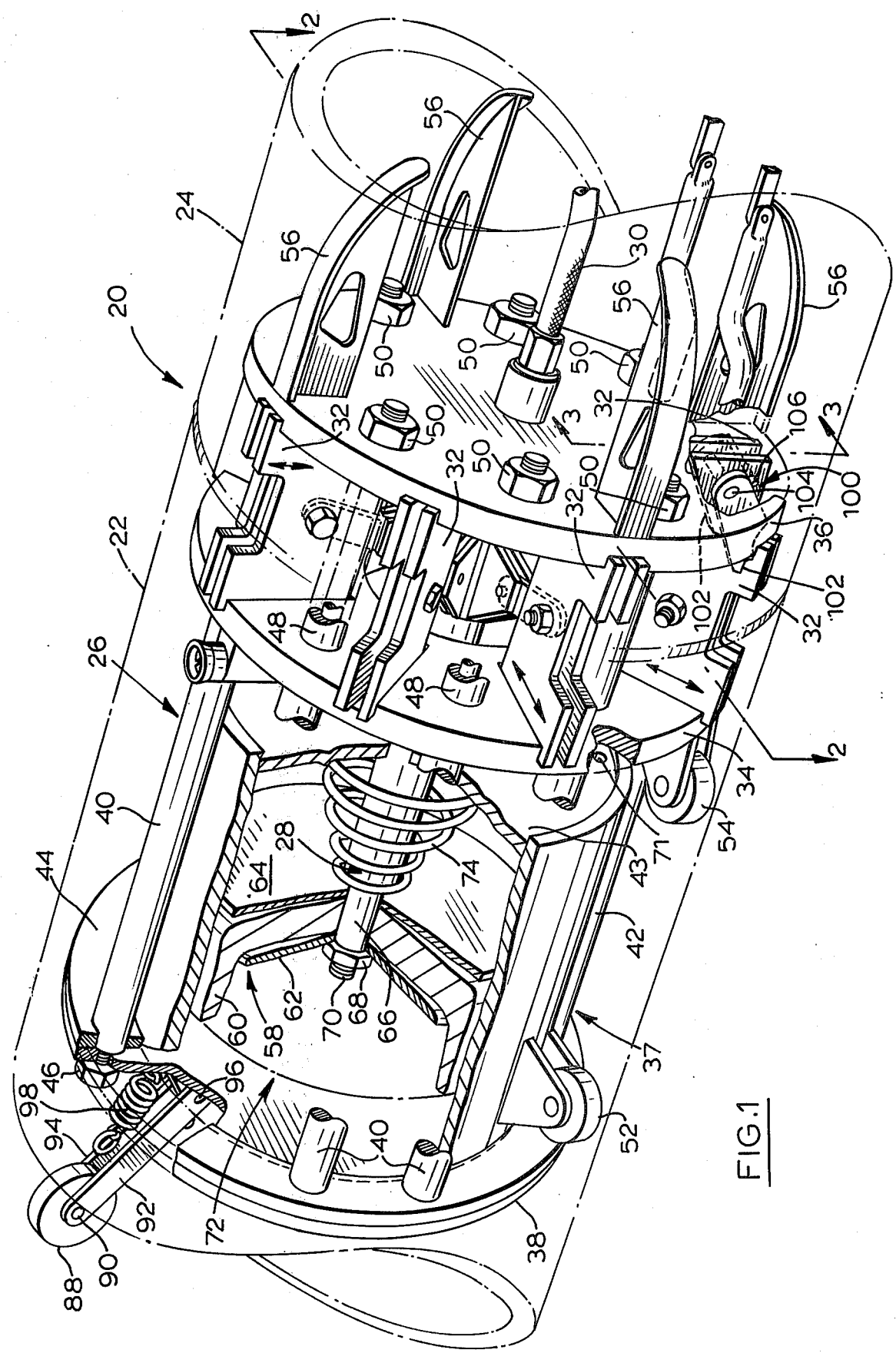
FIG. 1 is a cut-away perspective view of a preferred embodiment of pipe aligning apparatus according to the invention and showing end portions of a pair of pipe sections in ghost outline.

Reference is first made to FIG. 1 which illustrates apparatus according to a preferred embodiment of the invention and designated generally by the numeral 20. An installed pipe section 22 is shown in ghost outline together with a further pipe section 24 which is about to be welded to the installed section pipe 22. The apparatus consists essentially of a pneumatic actuator 26 having a hollow piston rod 28 and coupled at its outer extremity to a pneumatic supply line 30 and radial engagement elements 32 coupled to the piston rod 28 so that operation of the pneumatic actuator 26 results in moving the elements 32 radially outwards into engagement with the inner surfaces of the pipe sections 22, 24. This movement aligns the pipe section 24 with the pipe section 22 and permits welding to take place to join these sections. After such joining, the actuator is de-energized and the apparatus can then be drawn through the pipe section 24 which then effectively becomes an installed pipe section and the apparatus is moved to the end of this section (not shown in the drawings) for attachment of another pipe section.

There are three main structural parts in the apparatus, namely a pair of heavy circular discs 34, 36 and a cylinder assembly 37 forming a mutual part of the actuator 26. The assembly 37 includes a series of stepped rods 40 which are welded to the outer surface of a pneumatic cylinder 42 and located in an end ring 44 welded to one end of the cylinder 42. The cylinder has an end wall 43 and beyond the end ring 44, the rods 40 have reduced diameters which are threaded to receive nuts 46 to clamp the end cover 38 in sealing contact with the end ring 44. Preferably a gasket would be used in this joint, although for clarity of drawing, no gasket is shown. The rods 40 are also of reduced diameter where they pass through the discs 34, 36 and cylindrical sleeves 48 are positioned between the disc to act as spacers. Outer ends of the rods 40 are threaded to receive nuts 50 which hold the discs in position on the rods 40.

A first pair of wheel assemblies 52 (one of which can be seen) are attached to the cylinder 42 adjacent end cover 38 and a further pair of wheel assemblies 54 are attached to disc 34 on a surface facing the end cover 38. The wheel assemblies 52, 54 project slightly beyond disc 34 and end cover 38 so that the apparatus can be moved within pipe 22 with these wheels in contact with the inner surface of the pipe.

The basic structure also includes four guide shoes 56 which project axially and which are welded to the disc 36 for guiding pipe section 24 into position on the apparatus.

The pneumatic actuator 26 also includes a piston 58 consisting of a flexible lip seal element 60 in engagement with a smooth inner surface of the cylinder 42 and rigidified by respective inner and outer circular elements 62, 64. All of the elements 62, 64 and 60 are located on the piston rod 28 at a portion 66 of reduced diameter so that the elements 62, 64 and 60 can be drawn into tight engagement with a shoulder at the end of this portion using a nut 68. This nut is threaded onto a threaded portion 70 having a smaller diameter than that of the portion 66. Although it cannot be seen in this view, it should be remembered that the piston rod 28 is hollow throughout its length so that pressurized air can be transmitted from the supply line 30 to a chamber 72 created between the piston 58 and the end cover 38. It should also be noted that end wall 43 defines a hole 71 to vent the space between the piston 58 and end wall 43.

Piston 58 is biased toward a rest position by a coiled compression spring 74 located about the piston rod 28 and between elements 64 and end wall 43. As will be described, when the piston is energized it moves longitudinally from the rest position shown in FIG. 1 to a displaced position in which the engagement elements 32 are in frictional engagement with the inner surfaces of the pipe sections 22, 24. This movement of the piston is guided by the piston rod which slides in suitably formed central opening in end plate 43 and disc 36. Suitable bearings can be provided if preferred.

Figure 2:
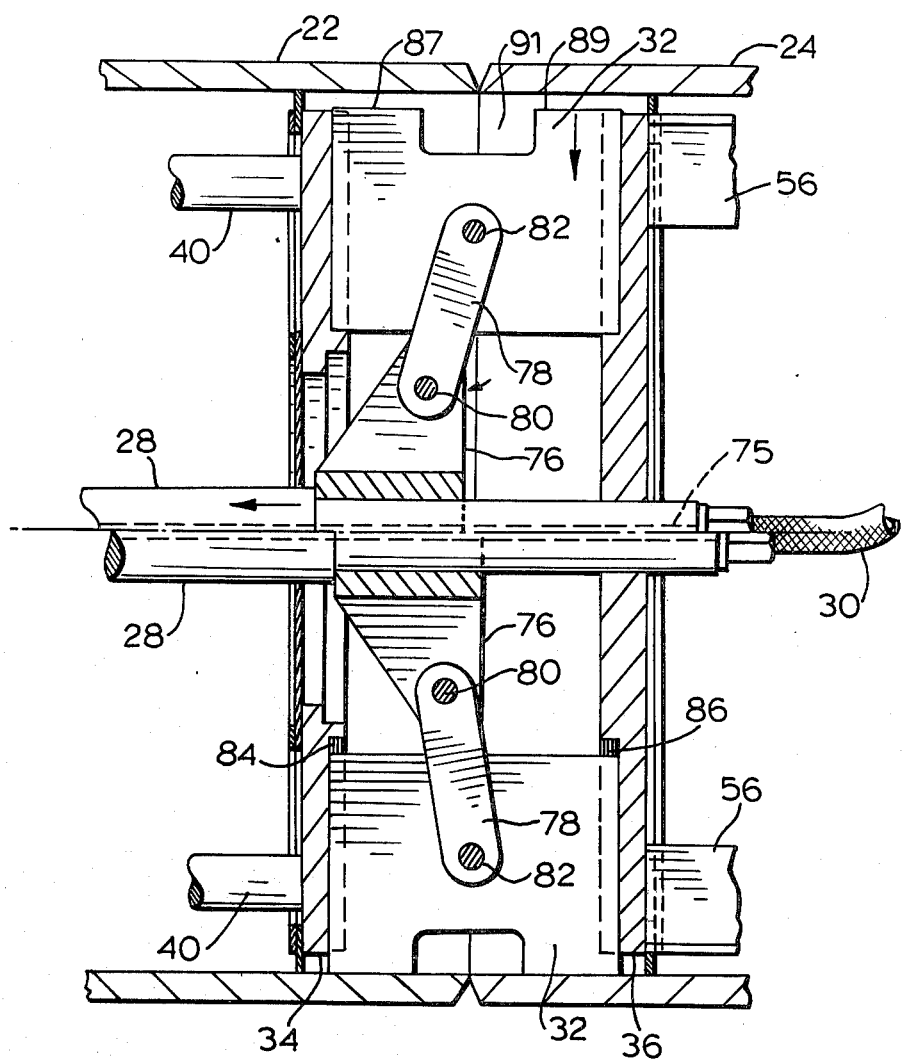
FIG. 2 is a compound sectional view on line 2—2 of FIG. 1 showing parts of the apparatus used to contact adjacent end portions of the pipe sections, an upper half of the figure showing the parts in a withdrawn position and a lower half showing the parts in an engagement position, the background elements behind the section having been omitted for clarity of drawing.

Reference is now made to FIGS. 1 and 2, with particular reference to FIG. 2 to describe the connection between the piston rod 28 and the engagement elements 32. The upper half of FIG. 2 illustrates the parts when the piston is in the rest position and the lower half illustrates the parts after the piston has moved into a displaced position under the influence of compressed air supplied by way of air supply 30 and longitudinal opening 75.

Piston rod 28 has pairs of brackets 76 attached to the rod in generally radial fashion and such that each pair is parallel to one another. Each pair of brackets supports one of a series of short links 78 on respective pivot pins 80 and the links are also pivoted to respective pins 82, each of which is supported between similar outer parts of engagement elements 32. These outer parts are separated from one another by spacers which are welded to the outer parts. For clarity of drawing, the spacers have been omitted. Each of the elements 32 sits in a corresponding one of pairs of radial guides 84, 86 formed in the discs 34, 36 to guide the elements between withdrawn and engagement position. The outer surfaces of the elements 32 define lands 87, 89 separated by a recess 91 which ensures that the elements are not damaged during welding of the pipe sections.

As will be seen from a comparison of the upper and lower parts of FIG. 2, when the piston rod 28 is moved to the right of FIG. 2 (i.e., away from end cover 38), the links 78 are forced to rotate about pins 80 thereby increasing the radial distances between the center of piston rod 28 and pivot pins 82. As a result, the elements 32 move radially in the guides 84, 86 and come into engagement with the inner surfaces of the installed pipe section 22 and the pipe section 24 which is about to be welded to the pipe section 22. The elements 32 can be disengaged after the pipes are welded to one another by simply venting the air supply so that the spring 74 (FIG. 1) will return the piston to the rest position thereby drawing the elements 32 radially inwards.

The basic structure necessary to locate two pipe sections has been described. However, it will be appreciated that further detail can be added to provide a more advantageous structure. For instance, positive location of the wheels of wheel assemblies 52, 54 will better track the apparatus as it moves through the pipe. Also, when the apparatus is drawn through the pipe it would be preferable to have means for locating the apparatus on the end of the pipe section before a subsequent section is engaged. Further, if the apparatus could be locked in position once it is located at the end of the pipe section this would ensure that the apparatus is not dislodged when another pipe section is brought into position. Yet a further improvement to the basic invention could be made by providing means for permit welding in atmospheres of inert gas which are sometimes used in special welding techniques.

Positive location of the wheel assemblies is provided by a biased wheel 88. This wheel is suspended by a pivot pin 90 located in a pair of pivoted arms 92, 94 which in turn are suspended from a pin 96 attached by a suitable bracket to the end cover 38. A coiled tension spring 98 is coupled both to the arms 92, 94 and to the plate 38 to bias the wheel 88 outwardly into contact with the inner surface of pipe section 22. Consequently, there is a reactive force at the wheel assemblies 52 which tends to maintain these wheels in contact with the inner surface of the pipe section 22 thereby tending to cause the apparatus to move longitudinally inside the pipe with a minimum of helical tracking.

It will be appreciated that once the pipe section 24 has been welded to the installed section 22, the apparatus must be drawn down the pipe section 24 to the end of this section. Although the apparatus can be located by eye, as mentioned, it is preferable to include some structure which will automatically position the apparatus on the end of the pipe section. Suitable structure is shown in perspective in FIG. 1 and in side view in FIG. 3 which also illustrates the operation of the structure. Referring initially to FIG. 1, a latch 100 is provided on a lowermost one of the elements 32. The latch consists of a pair of pawls 102 ganged together on a pin 104 which is rotatably mounted in this element 32.

Figure 3:
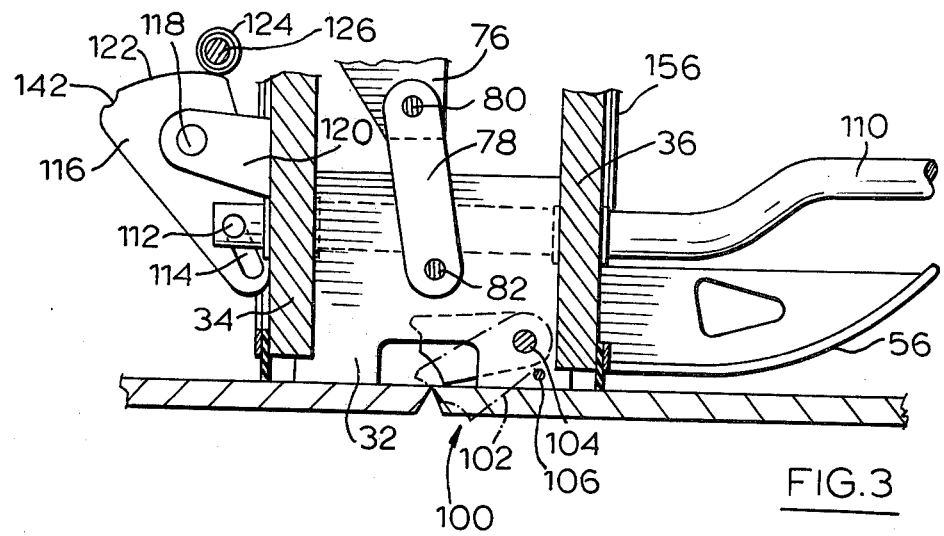
FIG. 3 is a sectional view on line 3—3 of FIG. 1 and illustrates a latch for locating the apparatus relative to the end of an installed pipe section.

The pawls 102 are shown in ghost outline in FIG. 3 in a withdrawn position. This is the position the pawls occupy as the apparatus is drawn along the pipe section. It will be evident that when the latch reaches the end of the pipe section the pawls will fall downwardly until a step formed in the ends of the pawls locates on the end of the pipe section. The pawls are then adjacent a safety stop 106. Once the pawls have fallen into this position, the apparatus can be pushed toward the pipe for positive engagement of the pawls and proper location.

As previously mentioned, it is preferable if the apparatus can then be locked in this position so that when a further pipe section is brought into engagement with the original pipe section the further section will dislodge the pawls inwardly into a position shown in FIG. 3 in broken outline. The latch is then no longer effective and will not have any effect on the welding procedure to be performed on the pipes.

Figure 4:
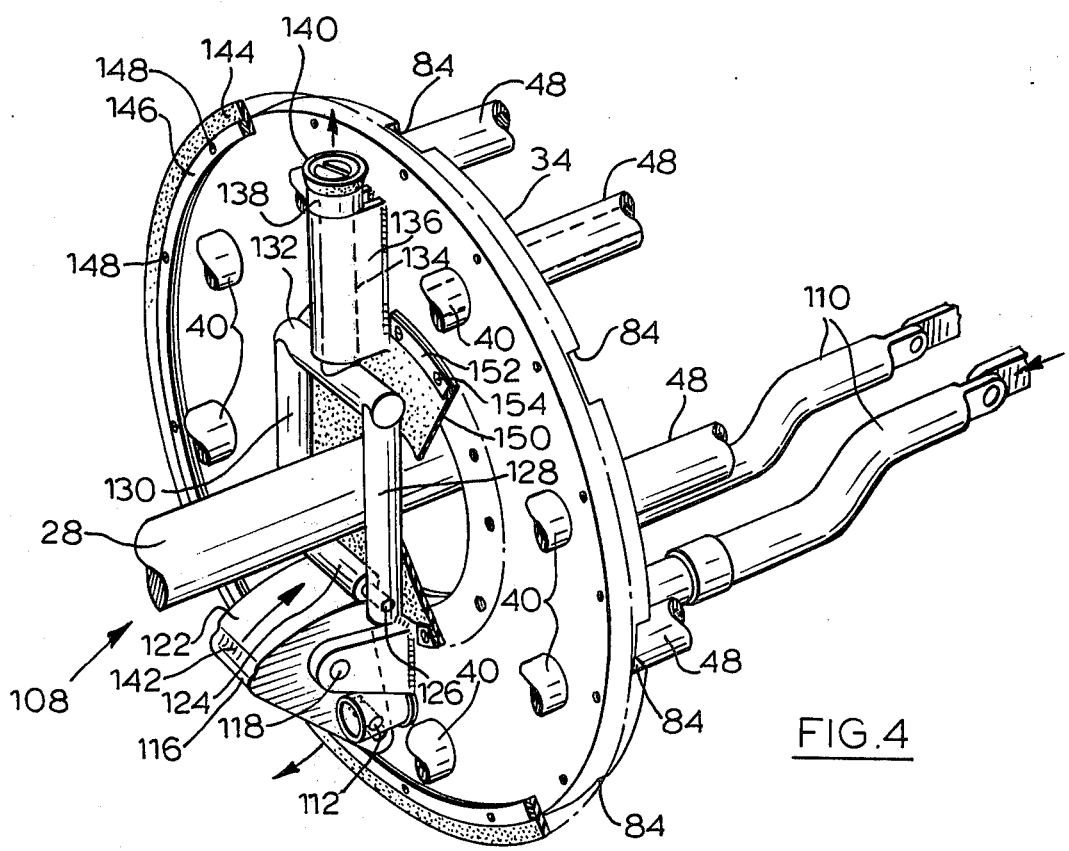
FIG. 4 is a perspective view of another part of the apparatus and illustrating a clamping mechanism for locking the apparatus in position in the installed pipe section.

A suitable form of lock or clamp is illustrated partly in FIG. 1 but more descriptively in FIG. 4 where it can be seen that the disc 34 has a locking mechanism 108 attached to it. This mechanism is controlled either manually or by a pneumatic actuator operating through ganged control rods 110. These rods project through disc 36 (see FIG. 1) and continue on to project through disc 34. The ends of the rods contain ends of a pin 112 which, as also seen in FIG. 3, rides in a slot 114 formed in a cam element 116. This element is pivoted on a pin 118 suspended between a pair of support arms 120 welded to the disc 34 and, consequently, when the control rods 110 are pushed through the disc 34, there is a resulting turning moment applied to the cam element 116 to cause the cam element to rotate about the pin 118 such that an upper cam surface 122 moves generally towards the disc 34.

A cam follower 124 is in the form of a roller mounted for rotation on a pin 126. Ends of the pin are engaged in a pair of parallel legs 128, 130 which are attached at their upper ends to a cross bar 132. The legs 128, 130 provide clearance about the piston rod 28 and an extension piece 134 projects upwardly from the cross bar 132 and rides in a bearing lock 136 attached to the disc 34. A collar 138 is provided on the projection 134 to prevent excessive downward movement through the bearing block 136 and a cup-shaped friction element 140 is provided at the extremity of the projection 134.

When it is desired to lock the apparatus in position in a pipe, the locking mechanism 108 is actuated by creating a longitudinal force in the control rods 110 to push the cam element 116 and thereby rotate this element about the pin 118. As a result, the surface 122 of the cam element passes under the cam follower 124 and the shape of the surface 122 is such that an upward motion is imparted to the follower 124. Consequently, the structure which includes the legs 128, 130 and cross bar 132 moves upwardly carrying the projection 134 through the bearing block 136. The friction element 140 is then forced into engagement with the inner surface of the pipe and the parts are proportioned such that this engagement with the pipe results in some distortion of the element 140 sufficient to permit the cam follower 124 to locate in a shallow cylindrical recess 142 in the cam surface 122. The force which was applied to the control rods 110 can then be removed and the mechanism will remain in a locked position with sufficient compressive force in the friction element 140 to ensure that there is adequate resistance to longitudinal movement of the apparatus along the pipe.

When it is desired to unlock the mechanism 108 a tensile force is applied to the rods 110 resulting in dislodging the cam follower 124 from the recess 142 and thereby allowing the cam to return to the position shown in FIG. 4. Again, although this structure is to be found in a preferred embodiment of the invention, it is not essential if an operator prefers to use a simpler structure and to rely on his skill to ensure that the apparatus is not moved inside the existing pipe section when a further pipe section is brought into contact with an existing section.

A further feature of the preferred embodiment which is not necessary in some applications is the provision of seals which will permit the chamber formed between discs 34, 36 to be filled with inert gas to enhance welding conditions where inert gas welding is desirable. As seen in FIG. 4, the disc 34 carries a flexible sealing ring 144 supported by a metal ring 146 attached by screws 148 to the disc 34. Also, a seal 150 is provided at the center of the disc 34 and proportioned to fit snugly about the piston rod 28. This seal is attached to disc 34 by a ring 152 and screws 154. The disc 36 (FIG. 1) also carries a seal similar to that shown in FIG. 4 on disc 34. However, it will be appreciated that the seal on disc 36 will have to be in sections to accommodate the guides 56. This seal is indicated by the numeral 156 in FIG. 3.

Although the sealing system will not be perfect, the seals will limit the loss of inert gases which are pressurized above the welding location and which pass between the ends of the pipe before welding takes place. This compares favorably with previous welding techniques where usage of inert gas was considerable and in fact it was very difficult to ensure that the welding location was immersed in inert gas.

It will now be appreciated that the apparatus according to the invention simplifies the attachment and welding of a section pipe to an existing pipe section. Firstly, the apparatus aids in guiding the new section of pipe into position and because the apparatus has been located using latch 100 and locking mechanism 108 there is little likelihood that the new section of pipe will dislodge the apparatus from its required position in the existing pipe. Consequently, once the new pipe section has been placed quite closely against the existing pipe, the pneumatic actuator can be energized to bring the elements 32 (FIG. 1) into engagement with the pipe sections. This engagement can at first be quite light so that the new section can be brought into position by pushing it longitudinally against the existing pipe and then further energizing of the actuator will result in a strong locking action which will both retain the new pipe section in position and align it with the existing pipe.

After welding has taken place, the locking mechanism 108 is disengaged and the apparatus can then be drawn longitudinally through the new pipe section and into position for receiving yet another section of pipe. This process is continued along the pipe until the necessary length of pipeline has been created.

Although the preferred embodiment has been found to be most suitable, it will be appreciated that some variations can be made within the scope of the invention. For instance, the links 78 and associated parts could be replaced by a suitable cam or wedge action provided that the elements 32 are restrained and biased inwardly so that they would return to an inner or disengaged position such as that shown at the top of FIG. 2. Similarly, although a pneumatic actuator is to be preferred, it is possible to use a hydraulic actuator and similarly the stop mechanism could be actuated directly by a pneumatic actuator or by a hydraulic actuator in place of the cam and follower arrangement. Modifications such as these are within the scope of the invention.

What we claim as our invention is:

1. Apparatus for use in aligning a new pipe section with an existing pipe section to facilitate welding the new pipe section to the existing pipe section, the apparatus being adapted to fit within the pipe sections and to be moved longitudinally along the pipe sections, the apparatus comprising:

actuator means disposed longitudinally and including a longitudinal rod;

a plurality of spaced-apart radial elements;

means fixedly coupled to the actuator means and defining radial guides for the radial elements to guide the elements between a withdrawn position and an engagement position in which the elements are positioned to engage both the existing and the new pipe sections to thereby align the new pipe section with the existing pipe section;

a plurality of links attached one to each of the radial elements and to the longitudinal rod, the links being inclined outwardly and away from the actuator means whereby a longitudinal force from the actuator means in a direction towards the links creates a compressive force in the links to cause the links to move the elements in the respective radial guides from the withdrawn to engagement positions;

a friction element adapted to be engaged against an internal surface of the existing pipe section to lock the apparatus in position relative to the existing pipe section;

a cam follower;

means fixedly coupling the cam follower to the friction element;

a cam element in contact with the cam follower and operable to move the cam follower transversely to thereby move the friction element into contact with the inner surface of the existing pipe section; and operating means coupled to the cam element for operating the cam element to move the friction element to thereby locking the apparatus in position relative to the existing pipe section.

2. Apparatus as claimed in claim 1 in which the actuator means is a pneumatic actuator.

3. Apparatus as claimed in claim 2 in which the longitudinal rod is hollow to convey compressed air to and from the actuator means.

4. Apparatus as claimed in claim 1 and further comprising a latch having at least one pawl for engaging the end of the existing pipe section to locate the apparatus longitudinally relative to this pipe section.

5. Apparatus for use in aligning a new pipe section with an existing pipe section to facilitate welding the new pipe section to the existing pipe section, the apparatus being adapted to fit within the pipe sections and to be moved longitudinally along the pipe sections, the apparatus comprising:
- a pneumatic actuator having a cylinder about a longitudinal axis and a longitudinal piston rod projecting out of the cylinder;
- a plurality of spaced-apart radial elements;
- a pair of spaced-apart discs disposed transversely and fixedly coupled to the actuator, the discs defining parts of radial guides for guiding the radial elements between a withdrawn position and an engagement position in which the elements are positioned to engage both the existing and the new pipe sections to thereby align the new pipe section with the existing pipe section;
- a plurality of links attached one to each of the radial elements and to the piston rod, the links being inclined outwardly and away from the actuator whereby a longitudinal force from the actuator in a direction towards the links creates a compressive force in the links to cause the links to move the elements in the respective radial guides from the withdrawn to the engagement positions;
- a friction element adapted to be engaged against an internal surface of the existing pipe section to lock the apparatus in position relative to the existing pipe section;
- a cam follower;
- means fixedly coupling the cam follower to the friction element;
- a cam element in contact with the cam follower and operable to move the cam follower transversely to thereby move the friction element into contact with the inner surface of the existing pipe section; and
- operating means coupled to the cam element for operating the cam element to move the friction element thereby locking the apparatus in position relative to the existing pipe section.

6. Apparatus as claimed in claim 5 in which the longitudinal rod is hollow to convey compressed air to and from the actuator.

7. Apparatus as claimed in claim 5 and further comprising a latch attached to one of the radial elements and having at least one pawl for engaging the end of the existing pipe section to locate the apparatus longitudinally relative to this pipe section.

* * * * *